(12) United States Patent
Kaneko et al.

(10) Patent No.: US 11,264,909 B2
(45) Date of Patent: Mar. 1, 2022

(54) CONTROL DEVICE OF MULTI-PHASE CONVERTER AND POWER SUPPLY SYSTEM

(71) Applicant: TOYOTA JIDOSHA KABUSHIKI KAISHA, Toyota (JP)

(72) Inventors: Tomohiko Kaneko, Ashigarakami-gun (JP); Masayuki Itou, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 3 days.

(21) Appl. No.: 17/015,285

(22) Filed: Sep. 9, 2020

(65) Prior Publication Data

US 2021/0159797 A1    May 27, 2021

(30) Foreign Application Priority Data

Nov. 27, 2019    (JP) .............................. JP2019-214564

(51) Int. Cl.
| *H02M 3/158* | (2006.01) |
| *H02M 3/28* | (2006.01) |
| *B60L 58/40* | (2019.01) |
| *B60L 50/51* | (2019.01) |
| *H02P 27/06* | (2006.01) |

(Continued)

(52) U.S. Cl.
CPC ........... *H02M 3/1584* (2013.01); *B60L 50/51* (2019.02); *B60L 58/40* (2019.02); *H01M 8/0494* (2013.01); *H02M 3/285* (2013.01); *H02P 27/06* (2013.01); *B60L 2210/14* (2013.01);

(Continued)

(58) Field of Classification Search
CPC ........... H01M 8/0494; H01M 2250/20; H02M 3/1584; H02M 3/285; H02M 1/007; H02M 1/0009; B60L 58/40; B60L 50/51; B60L 2210/14; H02P 27/06; H02P 2201/07
See application file for complete search history.

(56) References Cited

U.S. PATENT DOCUMENTS 8,836,298 B1 *  9/2014  Chen .................... H02M 3/1584
                                                        323/268
10,804,697 B2 * 10/2020  Karino .................. H02M 3/155
(Continued)

FOREIGN PATENT DOCUMENTS

JP    5787114 B2    8/2015
JP    6450884 B2    12/2018

*Primary Examiner* — Rafael O De Leon Domenech
(74) *Attorney, Agent, or Firm* — Finnegan, Henderson, Farabow, Garrett & Dunner, LLP (57) ABSTRACT

A control device of a multi-phase converter having N converter circuits connected in parallel includes: a determination unit configured to determine each share ratio of the N converter circuits to unevenly share input current to the multi-phase converter among the N converter circuits such that a conversion efficiency indicating a ratio of output power from the multi-phase converter with respect to input power to the multi-phase converter is higher in the case where the input current is unevenly shared by the N converter circuits compared to the case where the input current is evenly shared by the N converter circuits when the number of driven converter circuits is one or more and N−1 or less and the start condition is satisfied; and a diagnosis unit configured to diagnose an abnormality of the N converter circuits when the N converter circuits are driven in accordance with the determined share ratios.

6 Claims, 6 Drawing Sheets

(51) Int. Cl.
*H01M 8/04858* (2016.01)
*H02M 1/00* (2006.01)

(52) U.S. Cl.
CPC ........ *H01M 2250/20* (2013.01); *H02M 1/007* (2021.05); *H02M 1/0009* (2021.05); *H02P 2201/07* (2013.01)

(56) References Cited

U.S. PATENT DOCUMENTS

| | | | | |
|---|---|---|---|---|
| 2011/0307136 A1* | 12/2011 | Komata | ................ | B60K 6/365 |
| | | | | 701/22 |
| 2014/0005901 A1* | 1/2014 | Inuta | ................ | F16H 61/06 |
| | | | | 701/54 |
| 2014/0225435 A1 | 8/2014 | Imanishi | | |
| 2015/0217762 A1* | 8/2015 | Cao | ................ | B60W 10/08 |
| | | | | 477/4 |
| 2017/0012569 A1* | 1/2017 | Koseki | ................ | H02P 29/40 |
| 2018/0097454 A1* | 4/2018 | Komatsu | ................ | H02M 7/49 |
| 2019/0058411 A1 | 2/2019 | Kitamoto | | |
| 2020/0403495 A1* | 12/2020 | Lu | ................ | H02M 1/32 |

* cited by examiner

CONTROL DEVICE OF MULTI-PHASE CONVERTER AND POWER SUPPLY SYSTEM

INCORPORATION BY REFERENCE

The disclosure of Japanese Patent Application No. 2019-214564 filed on Nov. 27, 2019 including the specification, drawings and abstract is incorporated herein by reference in its entirety.

BACKGROUND

1. Technical Field

The disclosure relates to a control device of a multi-phase converter and a power supply system.

2. Description of Related Art

A multi-phase converter including a plurality of boost converter circuits is known (for example, see Japanese Patent No. 6450884 (JP 6450884 B)). In such a multi-phase converter, by adjusting the number of driven converter circuits in accordance with the magnitude of an input current, the converter circuits can be used in a range with a good conversion efficiency from the input power to the output power.

SUMMARY

For example, whether the converter circuits are abnormal can be diagnosed based on the value of a current flowing through the reactors of the converter circuits that are being driven. However, for example, when only one converter circuit is driven, the other converter circuits are stopped, and therefore it is not possible to diagnose whether the other converter circuits are abnormal. Thus, it is necessary to wait until all of the converter circuits are driven, and it may not be possible to execute an abnormality diagnosis at an early stage. Therefore, as described above, even when only one converter circuit is driven, it is conceivable to drive all converter circuits to execute the abnormality diagnosis. However, in this case, since all of the converter circuits are driven in the state where only one converter circuit is originally driven in accordance with the magnitude of the input current, the conversion efficiency may decrease.

The disclosure provides a control device of a multi-phase converter and a power supply system that can execute an abnormality diagnosis at an early stage while suppressing a decrease in conversion efficiency.

A first aspect of the disclosure relates to a control device of a multi-phase converter having N boost converter circuits connected in parallel in which N≥3 holds. The control device includes: an evaluation unit configured to evaluate whether a start condition for abnormality diagnosis of the multi-phase converter is satisfied in a state where the number of driven converter circuits is one or more and N−1 or less; a determination unit configured to determine a share ratio of each of the N converter circuits to unevenly share input current to the multi-phase converter among the N converter circuits, when the start condition is satisfied, such that a conversion efficiency indicating a ratio of output power from the multi-phase converter with respect to input power to the multi-phase converter is higher in a case where the input current is unevenly shared by the N converter circuits compared to a case where the input current is evenly shared by the N converter circuits; a drive unit configured to drive the N converter circuits in accordance with the determined share ratios; and a diagnosis unit configured to diagnose an abnormality of the N converter circuits in a state where the N converter circuits are driven in accordance with the determined share ratios.

That is, when the start condition of the abnormality diagnosis is satisfied in a case where at least one converter circuit is being driven and at least one converter circuit is stopped, the input current to the multi-phase converter is unevenly shared by all of the converter circuits and all of the converter circuits are driven so that the conversion efficiency is higher in the case where the input current is unevenly shared by the converter circuits compared to the case where the input current is evenly shared by the converter circuits. This makes it possible to execute the abnormality diagnosis for all of the converter circuits at an early stage while suppressing a decrease in the conversion efficiency.

The determination unit may be configured to determine each share ratio such that a total of the share ratios of the same number of the converter circuits as the number of driven converter circuits when the start condition is satisfied occupies 90% or more of the total of the share ratios of the N converter circuits.

The determination unit may be configured to determine each share ratio such that a current flows discontinuously through at least one reactor of the N converter circuits.

The determination unit may be configured to determine each share ratio such that a current flows discontinuously through all of the reactors of the N converter circuits.

A second aspect of the disclosure relates to a power supply system including: the control device of the multi-phase converter according to the first aspect described above; the multi-phase converter; and a power supply that supplies the input power to the multi-phase converter.

The power supply may be a fuel cell stack.

According to the disclosure, a control device of a multi-phase converter and a power supply system that can execute an abnormality diagnosis at an early stage while suppressing a decrease in conversion efficiency can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Fuel Cell System

Figure 1:
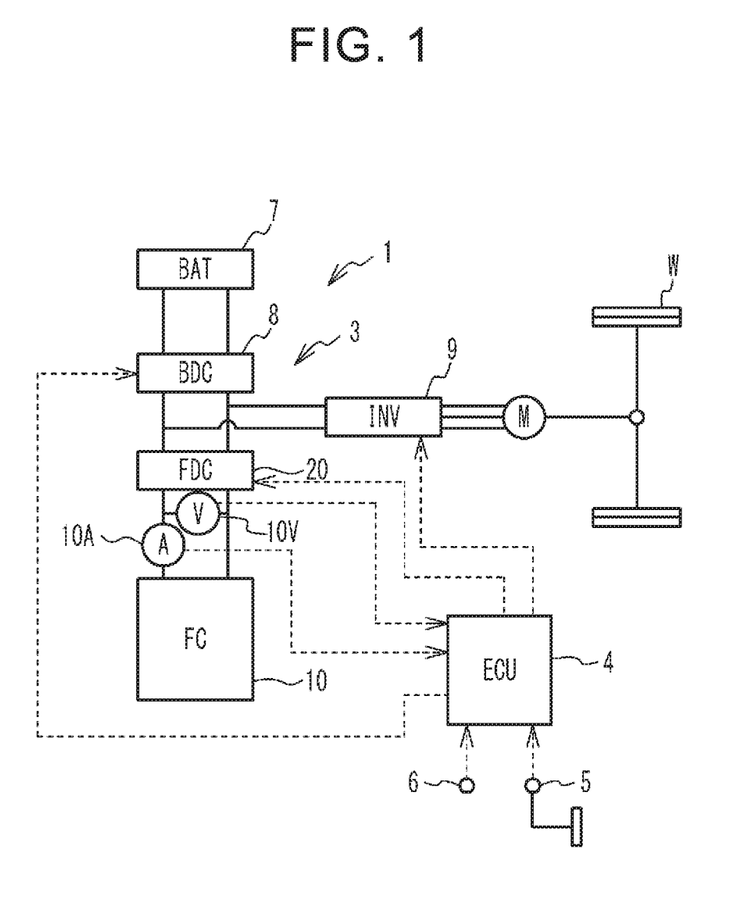
FIG. 1 is a configuration diagram of a fuel cell system mounted on a vehicle.

FIG. 1 is a configuration diagram of a fuel cell system 1 mounted on a vehicle. The fuel cell system 1 includes a power control system 3, an electronic control unit (ECU) 4, a secondary battery (hereinafter referred to as "BAT") 7, and a fuel cell stack (hereinafter referred to as "FC") 10. The power control system 3 includes a battery converter (hereinafter referred to as "BDC") 8, an inverter (hereinafter referred to as "INV") 9, and a boost converter (hereinafter referred to as "FDC") 20. Although not shown in FIG. 1, the fuel cell system 1 includes an oxidant gas supply system and a fuel gas supply system that supply an oxidant gas and a fuel gas to the FC 10, respectively. Further, the vehicle is equipped with a traction motor M, wheels W, an accelerator operation amount sensor 5, and an ignition switch 6.

The FC 10 is supplied with the fuel gas and the oxidant gas to generate electric power. The FC 10 is formed by stacking a plurality of solid polymer electrolyte unit cells. Each unit cell includes a membrane electrode assembly that is an electric power generator in which electrodes are arranged on both surfaces of an electrolyte membrane, and a pair of separators that holds the membrane electrode assembly therebetween. The electrolyte membrane is a solid polymer membrane formed of a fluorinated resin material or a hydrocarbon resin material having a sulfonic acid group, and has good proton conductivity in a wet state. The electrode includes a carbon carrier and an ionomer that is a solid polymer having a sulfonic acid group and has good proton conductivity in a wet state. The carbon carrier carries a catalyst (for example, platinum or platinum-cobalt alloy) for promoting power generation reaction. Each unit cell is provided with a manifold through which a reaction gas and a coolant flow. The reaction gas flowing through the manifold is supplied to a power generation region of each unit cell via a gas flow path provided in each unit cell.

The FDC 20 is a direct-current-to-direct-current (DC/DC) converter that boosts a direct current (DC) voltage output from the FC 10 at a predetermined boost ratio and supplies the output power from the FC 10 to the INV 9. The INV 9 converts the input DC power into a three-phase alternating current (AC) power and supplies the three-phase AC power to the motor M. The motor M drives the wheels W to cause the vehicle to travel. The BDC 8 is a bidirectional DC/DC converter. That is, the BDC 8 drops a DC voltage adjusted by the FDC 20 or boosts the DC voltage of the BAT 7 and supplies the output power from the BAT 7 to the INV 9. The BDC 8 does not necessarily have to be provided. The BAT 7 can store the electric power of the FC 10.

The ECU 4 includes a central processing unit (CPU), a read-only memory (ROM), and a random access memory (RAM). The ECU 4 is electrically connected to the accelerator operation amount sensor 5, the ignition switch 6, a current sensor 10A, a voltage sensor 10V, the FDC 20, the BDC 8, and the INV 9. The ECU 4 controls the output power of the FC 10 based on the detection value of the accelerator operation amount sensor 5 and the like. Further, the ECU 4 acquires the output current value of the FC 10 measured by the current sensor 10A and the output voltage value of the FC 10 measured by the voltage sensor 10V. The ECU 4 is an example of a control device that controls the FDC 20, and executes abnormality diagnosis control, which will be described in detail later. The abnormality diagnosis control is realized by an evaluation unit, a determination unit, a drive unit, and a diagnosis unit which are functionally realized by the CPU, the ROM, and the RAM of the ECU 4.

Circuit Configuration of FDC

Figure 2:
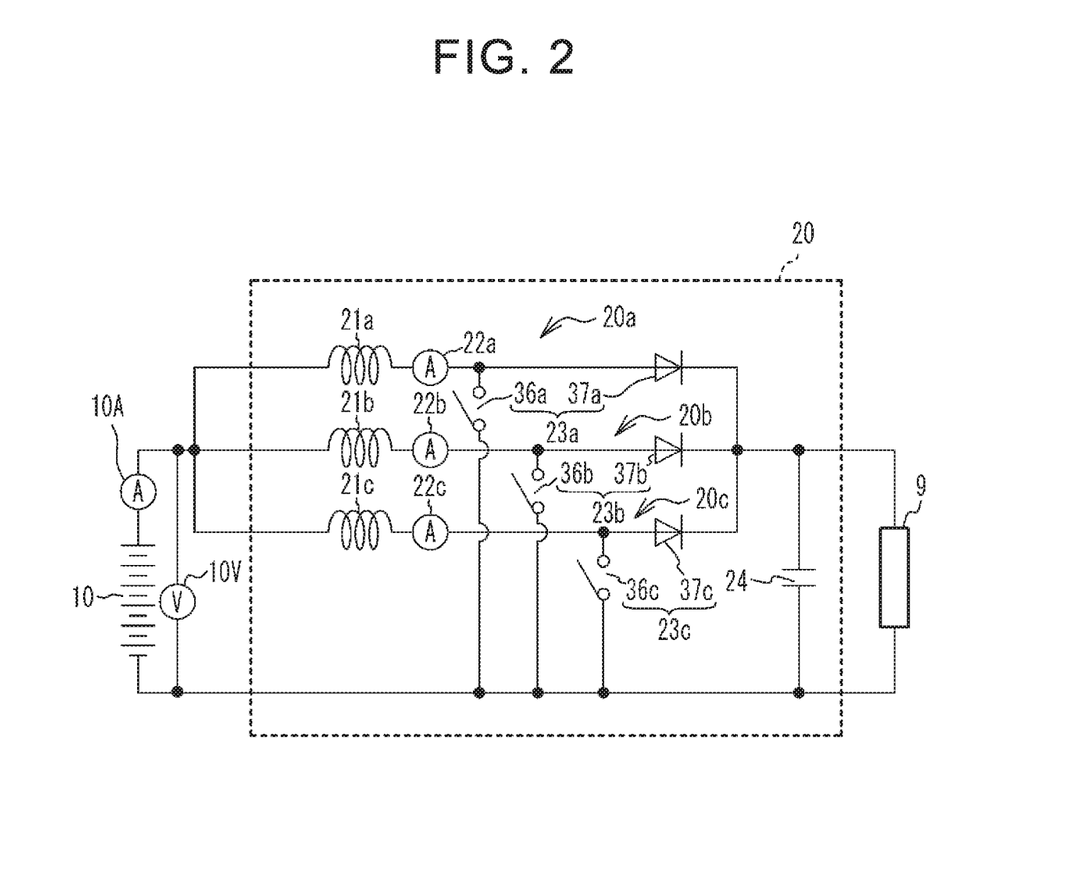
FIG. 2 is a diagram showing a circuit configuration of a boost converter.

FIG. 2 is a diagram showing a circuit configuration of the FDC 20. FIG. 2 also shows the FC 10 and the INV 9. As shown in FIG. 2, the FDC 20 includes converter circuits 20a to 20c and a capacitor 24. The converter circuit 20a includes a reactor 21a, a current sensor 22a, and an intelligent power module (IPM) 23a. The converter circuit 20b includes a reactor 21b, a current sensor 22b, and an IPM 23b. The converter circuit 20c includes a reactor 21c, a current sensor 22c, and an IPM 23c. The IPM 23a includes a switching element 36a and a diode 37a. The IPM 23b includes a switching element 36b and a diode 37b. The IPM 23c includes a switching element 36c and a diode 37c.

The reactor 21a, the current sensor 22a, and the diode 37a are connected in series. Similarly, the reactor 21b, the current sensor 22b, and the diode 37b are also connected in series. The reactor 21c, the current sensor 22c, and the diode 37c are also connected in series. These components connected in series are connected in parallel between the positive electrode side of the FC 10 and the positive electrode side of the INV 9. This makes it possible to reduce the value of the current flowing through each of the reactors 21a to 21c and the IPMs 23a to 23c and suppress heat generation. The switching element 36a is connected between a portion between the reactor 21a and the diode 37a, and the negative electrode side of the FC 10. Similarly, the switching element 36b is connected between a portion between the reactor 21b and the diode 37b, and the negative electrode side of the FC 10. The switching element 36c is connected between a portion between the reactor 21c and the diode 37c, and the negative electrode side of the FC 10. The reactors 21a to 21c are, for example, the same components having the same configurations and performances, but are not limited thereto. The current sensors 22a to 22c are respectively connected to the reactors 21a to 21c on the downstream side, but are not limited to this and may be respectively connected to the reactors 21a to 21c on the upstream side. The FC 10 and the reactors 21a to 21c are electrically connected by a bus bar.

Figure 3A:
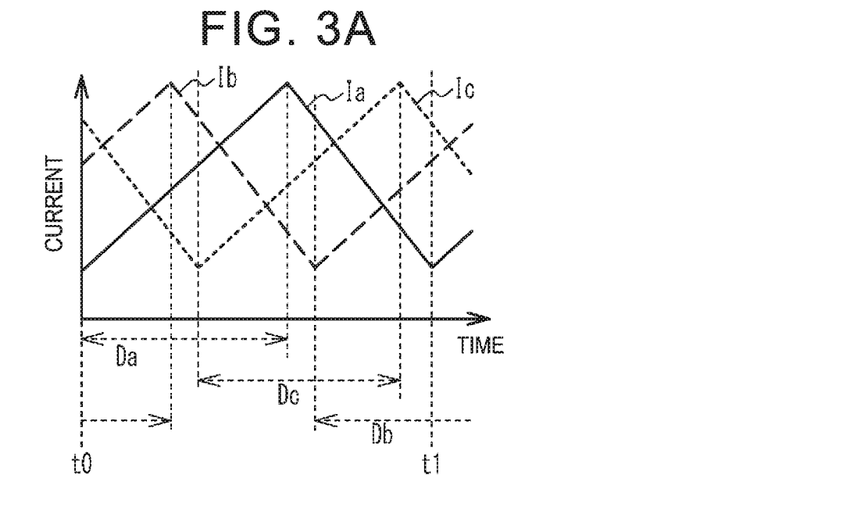
FIG. 3A is a diagram showing a transition of currents respectively flowing through reactors when all of converter circuits are driven.

FIG. 3A is a diagram showing a transition of currents Ia to Ic respectively flowing in the reactors 21a to 21c when all of the converter circuits 20a to 20c are driven. The ECU 4 switches ON/OFF each of the switching elements 36a to 36c, for example, at a same constant cycle T. The cycle T from the time when the switching element 36a is switched from OFF to ON to the time when the switching element 36a is switched from OFF to ON next corresponds to the cycle of the switching control of the switching element 36a. The time from the time when the switching element 36a is switched from OFF to ON to the time when the switching element 36b is switched from OFF to ON corresponds to ⅓ of the cycle T. The time from the time when the switching element 36b is switched from OFF to ON to the time when the switching element 36c is switched from OFF to ON corresponds to ⅓ of the cycle T. The ON/OFF switching of the switching elements 36a to 36c is controlled based on duty ratios of the pulse signals supplied to the switching elements 36a to 36c. The duty ratio is the ratio of the time during the ON state in one ON/OFF cycle. The ECU 4 determines the duty ratios based on the current values measured by the current sensors 22a to 22c and the target boost ratio. In the example of FIG. 3A, the respective duty ratios [%] of the switching elements 36a to 36c are the ratios Da to Dc, which are almost the same values.

When the switching element 36a is turned ON, a current starts to flow from the FC 10 to the switching element 36a via the reactor 21a, and magnetic energy due to DC excitation is stored in the reactor 21a. When the switching element 36a is turned OFF, the magnetic energy that has been stored in the reactor 21a during the ON period is output as a current to the INV 9 via the diode 37a. Therefore, by controlling the duty ratios of the switching elements 36a to 36c, the energy (time average) stored in each of the reactors 21a to 21c can be controlled, and the average current (effective current) that flows to each of the reactors 21a to 21c can be controlled. The ON/OFF switching of the switching elements 36a to 36c is repeated.

An induced voltage generated by the magnetic energy that has been stored in the reactor 21a when the switching element 36a is turned OFF is superposed on the output voltage of the FC 10, and a voltage higher than the output voltage of the FC 10 is applied to the INV 9. The same applies to the switching elements 36b and 36c and the reactors 21b and 21c. The ECU 4 transmits a control signal so that the switching elements 36a to 36c are sequentially turned ON, and the induced voltages is sequentially superposed on the output voltage of the FC 10. As a result, the voltage input to the INV 9 is maintained higher than the output voltage of the FC 10. The capacitor 24 is connected between a portion between the diodes 37a to 37c and the positive electrode side of the INV 9, and the negative electrode side of the INV 9, and functions to reduce voltage fluctuation.

Number of Driven Converter Circuits

Figure 3B:
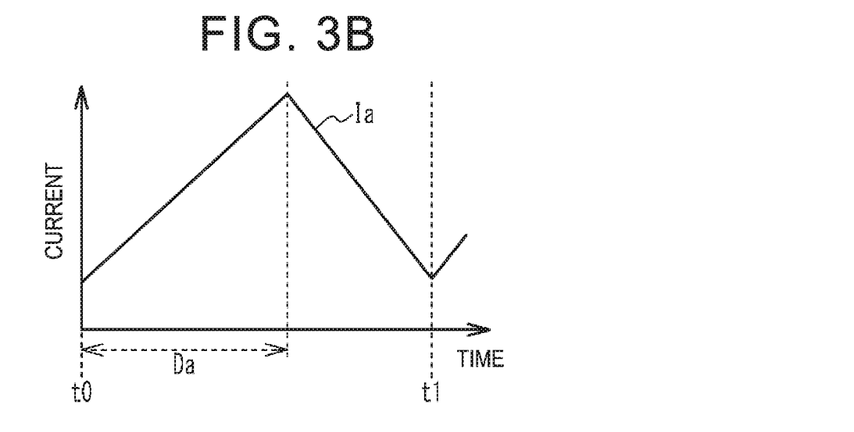
FIG. 3B is a diagram showing a transition of a current flowing through the reactor when only one converter circuit is driven.
Figure 3C:
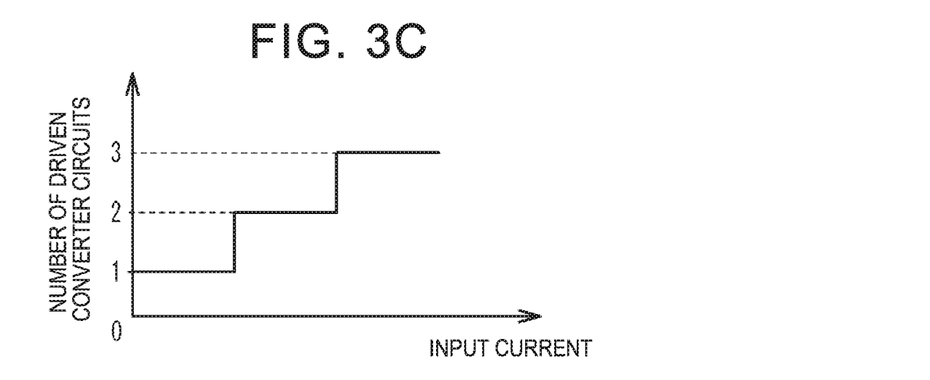
FIG. 3C is a map defining the relationship between an input current to the boost converter and the number of driven converter circuits.

FIG. 3B is a diagram showing a transition of the current Ia flowing through the reactor 21a when only one converter circuit 20a is driven. The ECU 4 can drive only the converter circuit 20a by constantly maintaining the switching elements 36b and 36c to the OFF state and controlling only the switching element 36a to be switched ON/OFF. That is, by controlling the number of the switching elements 36a to 36c that are constantly controlled to the OFF state, the number of the converter circuits 20a to 20c to be driven can be controlled. FIG. 3C is a map defining the relationship between the input current to the FDC 20 and the number of the driven converter circuits 20a to 20c. As shown in FIG. 3C, the ECU 4 increases the number of the driven converter circuits 20a to 20c as the input current to the FDC 20 increases. Each of the converter circuits 20a to 20c has a range with good conversion efficiency from the input power to the output power. The ECU 4 increases the number of the driven converter circuits 20a to 20c as the input current to the FDC 20 increases so that at least one of the converter circuits 20a to 20c is used in the above range. Note that, for example, when only one of the converter circuits 20a to 20c is driven, the same converter circuit 20a need not always be driven, and another converter circuit 20b or 20c may be used instead. The same applies when driving two of the converter circuits 20a to 20c.

The ECU 4 acquires the value of the input current to the 1-DC 20 measured by the current sensor 10A, and increases the number of the driven converter circuits 20a to 20c as the acquired input current value increases. However, the disclosure is not limited to this. For example, the ECU 4 may increase the number of the driven converter circuits 20a to 20c as the value of the input power to the FDC 20 increases or as the value of the input voltage to the FDC 20 decreases. Further, the ECU 4 may increase the number of the driven converter circuits 20a to 20c as a target output current value of the FDC 20 increases, as a target output power value of the FDC 20 increases, as a target output voltage value of the FDC 20 increases, or as a target boost ratio of the FDC 20 increases. The input current value, the input power value, and the input voltage value may be measured values or target values.

Abnormality Diagnosis

The ECU 4 executes abnormality diagnosis for diagnosing whether the converter circuits 20a to 20c are abnormal when a predetermined start condition is satisfied. Specifically, the ECU 4 diagnoses whether the converter circuits 20a to 20c are normal or abnormal based on whether the average values of the current flowing through the reactors 21a to 21c are in a normal range with all of the converter circuits 20a to 20c driven.

Figure 4A:
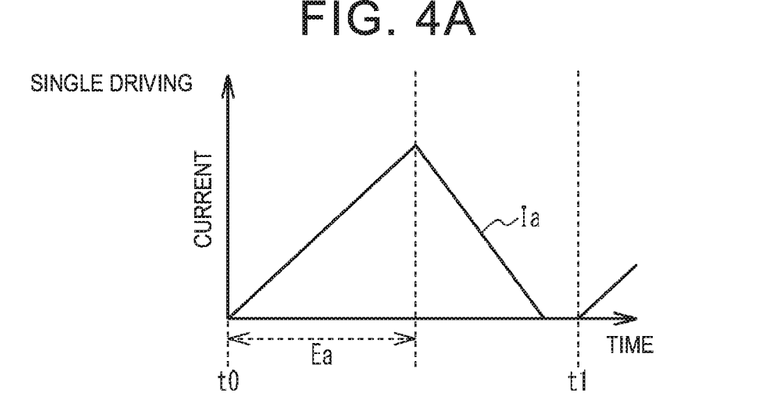
FIG. 4A is a diagram showing a transition of the current flowing through the reactor when only one converter circuit is driven.
Figure 4B:
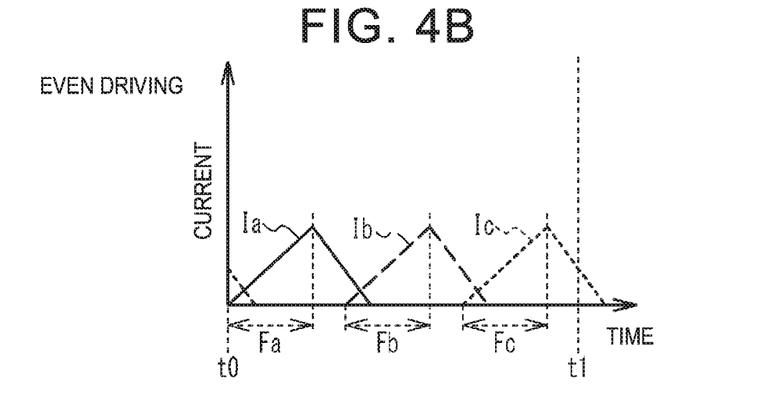
FIG. 4B is a diagram showing a transition of the currents respectively flowing through the reactors when the input current to the boost converter is evenly shared by all of the converter circuits and all of the converter circuits are driven.

FIG. 4A is a diagram showing a transition of the current Ia flowing in the reactor 21a when only one converter circuit 20a is driven. FIG. 4A shows a case where the current Ia flowing through the reactor 21a is smaller than that shown in FIG. 3B. It is assumed that only the converter circuit 20a is driven in accordance with the map shown in FIG. 3C and the duty ratio of the switching element 36a is set to a ratio Ea. For example, in such a case, even when the abnormality diagnosis is executed, whether the converter circuits 20b and 20c that are stopped are abnormal cannot be diagnosed. Thus, the abnormality diagnosis cannot be executed until all of the converter circuits 20a to 20c are driven. Namely, it is necessary to wait executing the abnormality diagnosis until all of the converter circuits 20a to 20c are driven. Therefore, when executing the abnormality diagnosis, it is conceivable that all of the converter circuits 20a to 20c are exceptionally driven without considering the map shown in FIG. 3C. In this case, it is conceivable that the input current to the FDC 20 is evenly shared by all of the converter circuits 20a to 20c and the converter circuits 20a to 20c are driven. FIG. 4B is a diagram showing the transition of the currents Ia to Ic respectively flowing through the reactors 21a to 21c when the input current to the FDC 20 is evenly shared by all of the converter circuits 20a to 20c and all of the converter circuits 20a to 20c are driven. In this case, the duty ratios of the switching elements 36a to 36c are respectively set to ratios Fa to Fc [%] so that the input current to the FDC 20 is evenly shared by all of the converter circuits 20a to 20c. An overall conversion efficiency of the FDC 20 in this case (hereinafter referred to as "overall conversion efficiency") is lower than the overall conversion efficiency when only the converter circuit 20a is driven. This point will be described below.

Overall Conversion Efficiency

Figure 4C:
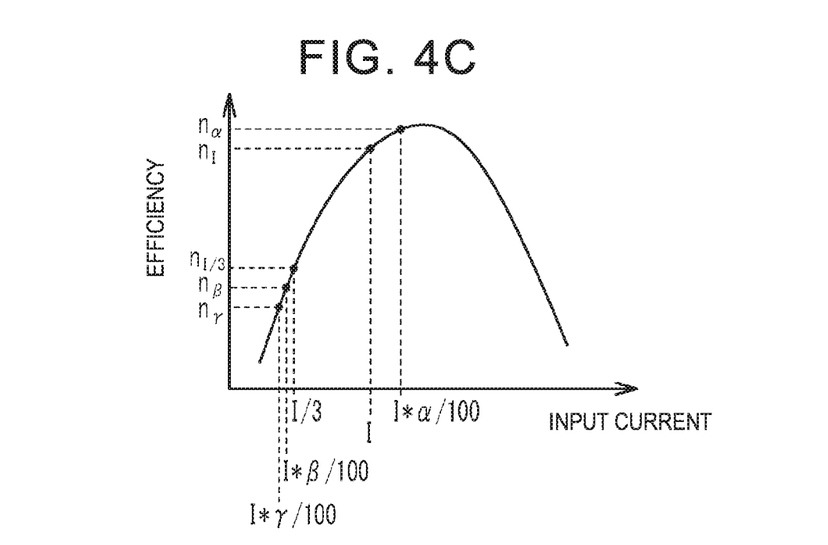
FIG. 4C is a graph showing each conversion efficiency of the converter circuits.

FIG. 4C is a graph showing each conversion efficiency of the converter circuits 20a to 20c. The horizontal axis in FIG. 4C shows the input current to the converter circuits 20a to 20c, and the vertical axis shows the conversion efficiency [%] of the converter circuits 20a to 20c. That is, the case where the conversion efficiency characteristics of the converter circuits 20a to 20c are the same will be described as an example. The conversion efficiency gradually increases as the input current increases, reaches a peak at a predetermined input current value, and gradually decreases as the input current further increases. The conversion efficiency takes a value of, for example, 70% to 99% depending on the magnitude of the input current.

As a premise, as shown in FIG. 4C, the conversion efficiency of the converter circuit in the case of an input current I to one converter circuit is indicated as ID, and the conversion efficiency in the case of an input current I/3 to one converter circuit is indicated as $\eta_{I/3}$, and $\eta_T > \eta_{I/3}$ holds.

Suppose a share ratio of the converter circuit 20a with respect to the input current I to the FDC 20 is α [%], the share ratio of the converter circuit 20b is β [%], and the share ratio of the converter circuit 20c is γ [%]. At this time, α+β+γ=100[%] and α≥0, β≥0, and γ≥0 hold. In this case, the input current to the converter circuit 20a is indicated by I*α/100, the input current to the converter circuit 20b is indicated by I*β/100, and the input current to the converter circuit 20c is indicated by I*γ/100. Therefore, the entire input current I to the FDC 20 can be expressed as follows.

$$I=(I*\alpha/100)+(I*\beta/100)+(I*\gamma/100) \quad (1)$$

Here, as shown in FIG. 4C, when the conversion efficiency of the converter circuit 20a in the case where the input current to the converter circuit 20a is I*α/100 is indicated by $\eta_\alpha$, the conversion efficiency of the converter circuit 20b in the case where the input current to the converter circuit 20b is I*β/100 is indicated by $\eta_\beta$, the conversion efficiency of the converter circuit 20c in the case where the input current to the converter circuit 20c is I*γ/100 is indicated by $\eta_\gamma$, an overall conversion efficiency $\eta_T$ can be expressed as follows.

$$\eta_T=(\eta_\alpha*\alpha/100)+(\eta_\beta*\beta/100)+(\eta_\gamma*\gamma/100) \quad (2)$$

As shown in FIG. 4A, when only the converter circuit 20a is driven with the input current I to the FDC 20, the respective share ratios are α=100 and β=γ=0, and the input current to the converter circuit 20a is I. The overall conversion efficiency $\eta_T$ can be expressed as follows based on equation (2).

$$\eta_T=\eta_\alpha=\eta_I \quad (3)$$

Next, the case where the input current I to the FDC 20 is evenly shared by the converter circuits 20a to 20c is assumed. In this case, each share ratio is α=β=γ=100/3, and the input current to each of the converter circuits 20a to 20c is I/3. Therefore, the overall conversion efficiency $\eta_T$ can be expressed as follows.

$$\eta_T=(\eta_\alpha/3)+(\eta_\beta/3)+(\eta_\gamma/3)=(\eta_{I/3}/3)+(\eta_{I/3}/3)+(\eta_{I/3}/3)$$
$$=\eta_{I/3} \quad (4)$$

Figure 5:
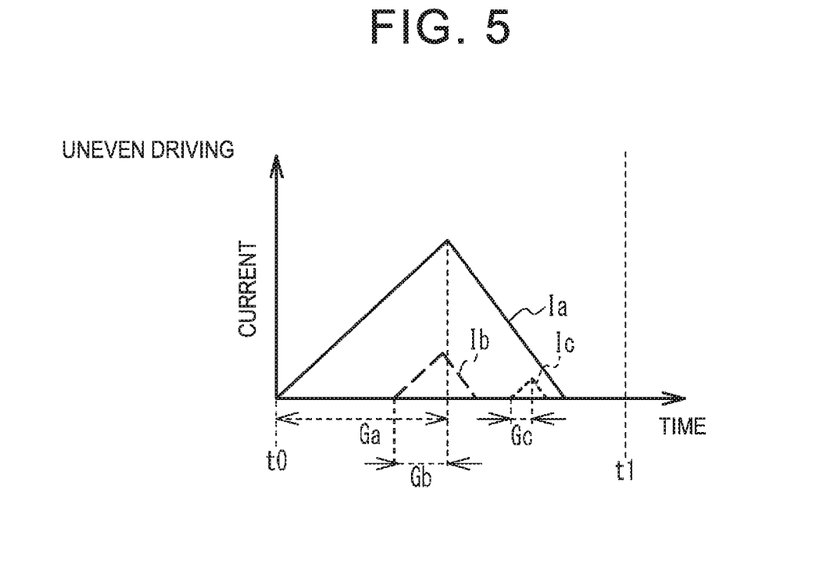
FIG. 5 is a diagram showing a transition of the currents respectively flowing through the reactors when the input current to the boost converter is unevenly shared.

Since $\eta_T > \eta_{I/3}$ holds as described above, the overall conversion efficiency when the input current to the FDC 20 is evenly shared by the converter circuits 20a to 20c and the converter circuits 20a to 20c are driven as shown in FIG. 4B is lower than the overall conversion efficiency when only the converter circuit 20a is driven as shown in FIG. 4A. Therefore, in the present embodiment, the ECU 4 unevenly shares the input current I to the FDC 20 among the converter circuits 20a to 20c so that the overall conversion efficiency becomes larger than $\eta_{I/3}$ to execute the abnormality diagnosis. FIG. 5 is a diagram showing the transition of the currents Ia to Ic respectively flowing through the reactors 21a to 21c when the input current I to the FDC 20 are unevenly shared by the converter circuits 20a to 20c. The duty ratios of the switching elements 36a to 36c are ratios Ga to Gc, respectively, and Ga>Gb>Gc holds. In this way, by unevenly sharing the input current I to the FDC 20 among the converter circuits 20a to 20c and driving the converter circuits 20a to 20c, it is possible to execute the abnormality diagnosis while suppressing a decrease in the overall conversion efficiency.

Here, the ECU 4 determines the share ratios α, β, and γ so that the overall conversion efficiency is larger than $\eta_{I/3}$. A memory of the ECU 4 stores in advance each conversion efficiency of the converter circuits as shown in FIG. 4C, and a map defining the share ratios α, β, and γ in which the overall conversion efficiency is higher when the input current is unevenly shared than when the input current is evenly shared depending on the value of the input current to the FDC 20. The ECU 4 refers to this map to determine the share ratios α, β, and γ, and controls the duty ratios of the switching elements 36a to 36c so as to be proportional to the determined share ratios α, β, and γ, respectively. This makes it possible to execute the abnormality diagnosis for all of the converter circuits 20a to 20c while suppressing a decrease in the overall conversion efficiency.

In the example of FIG. 5, the case where the share ratio α is the largest and the share ratio γ is the smallest is shown as an example. However, the disclosure is not limited to this, and any of the share ratios α, β, and γ may be the largest and the smallest. Further, two of the share ratios α, β, and γ may have the same value.

Also, the case where the conversion efficiency characteristics of the converter circuits 20a to 20c are the same has been shown as an example, but the disclosure is not limited to this. In this case, based on the conversion efficiency characteristics of each of the converter circuits 20a to 20c, the respective share ratios are determined so that the overall conversion efficiency when the input current is unevenly shared is improved compared to when the input current is evenly shared. Further, even when the start condition of the abnormality diagnosis is satisfied in the case where only the converter circuits 20a and 20b are driven and the converter circuit 20c is stopped, the respective share ratios are determined so that the overall conversion efficiency when the input current is unevenly shared is improved compared to when the input current is evenly shared. The share ratios α, β, and γ when the input current is unevenly shared are stored in the memory of the ECU 4, but the disclosure is not limited to this. The share ratios α, β, and γ in which the overall conversion efficiency when the input current is unevenly shared is improved compared to when the input current is evenly shared may be calculated by a substitution method or the like at the start of the abnormality diagnosis.

Abnormality Diagnosis Control

Figure 6:
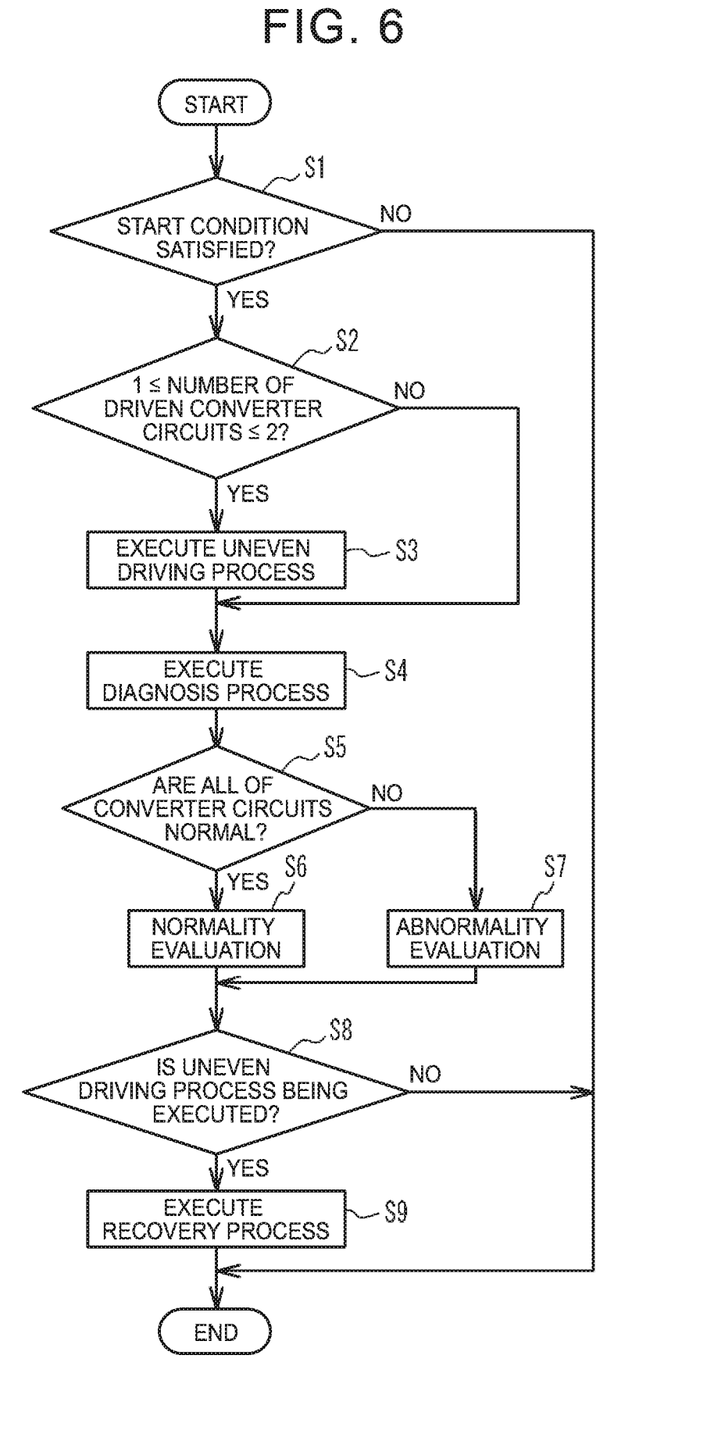
FIG. 6 is a flowchart showing an example of abnormality diagnosis control executed by an electronic control unit (ECU).

FIG. 6 is a flowchart showing an example of the abnormality diagnosis control executed by the ECU 4. This control is repeatedly executed every predetermined time. The ECU 4 evaluates whether the start condition of the abnormality diagnosis is satisfied (step S1). The start condition of the abnormality diagnosis includes, for example: (1) a predetermined time has elapsed since the previous abnormality diagnosis was executed; (2) the required output of the FC 10 is stable, that is, a sudden acceleration or a sudden deceleration in which the required output of the FC 10 changes transiently is not being performed; and (3) the FDC 20 is being driven. In the case of No in step S1, this control ends.

In the case of Yes in step S1, the ECU 4 evaluates whether the number of the driven converter circuits 20a to 20c is one or more and two or less (step S2). The number of the driven converter circuits 20a to 20c may be evaluated based on the value of the input current to the 1-DC 20 measured by the current sensor 10A with reference to the map shown in FIG. 3C. Alternatively, the number of the reactors 21a to 21c through which current is flowing may be evaluated based on the measured values of the current sensors 22a to 22c, and this may be evaluated as the number of the driven converter circuits 20a to 20c. The processes of steps S1 and S2 are examples of processes executed by the evaluation unit.

In the case of Yes in step S2, the ECU 4 executes an uneven driving process by determining the share ratios for unevenly sharing the input current to the FDC 20 among the converter circuits 20a to 20c and driving the converter circuits 20a to 20c (step S3). The process of step S3 is an example of a process executed by the determination unit and the drive unit. In the case of No in step S2, that is, when all of the converter circuits 20a to 20c are driven, the process of step S3 is not executed.

Next, the ECU 4 executes a diagnosis process (step S4). In the diagnosis process, it is diagnosed whether each of the converter circuits 20a to 20c is abnormal. For example, the diagnosis of the converter circuit 20a is performed as follows. Whether the average value of the current values measured by the current sensor 22a falls under the normal range is evaluated, and when the average value falls under the normal range, the converter circuit 20a is diagnosed as normal, and when the average value falls out of the normal range, the converter circuit 20a is diagnosed as abnormal. The same applies to the evaluation of the converter circuits 20b and 20c. Here, the normal range is a range in which the average value of the current flowing through the reactor of the converter circuit in the normal state can take. The normal range may be calculated based on the value of the input current to the FDC 20 and the share ratios of the converter circuits, or may be acquired in advance through an experiment and stored in the memory of the ECU 4. The average value of each current value is calculated by dividing a value obtained by integrating the current value with the time for one ON/OFF cycle of the switching element by the time for the one ON/OFF cycle.

When all of the converter circuits 20a to 20c are already driven when the start condition is satisfied (No in step S2), the normal range is acquired from the map or the normal range is calculated with the share ratios assumed to be $\alpha=\beta=\gamma=(100/3)$.

Next, the ECU 4 evaluates whether all of the converter circuits 20a to 20c are normal (step S5). When it is evaluated that all of the converter circuits 20a to 20c are normal, the ECU 4 evaluates that the FDC 20 is normal (step S6). When the normality evaluation is made, a normality flag is turned on. For example, the time when the normality flag is turned on is used as the start time of the time for executing the next diagnosis control. When it is evaluated that at least one of the converter circuits 20a to 20c is not normal, the ECU 4 evaluates that the FDC 20 is abnormal (step S7). When the abnormality evaluation is made, an abnormality flag is turned ON. For example, the power generation of the FC 10 and the driving of the FDC 20 may be stopped, the electric power of the BAT 7 may be used to cause the vehicle to travel in a limp home mode, and a warning light installed in the vehicle cabin may be turned on, etc., to notify the driver of the need for inspection or repair of the FDC 20. The processes of steps S4 to S7 are examples of processes executed by the diagnosis unit.

Next, the ECU 4 evaluates whether the uneven driving process is being executed (step S8). In the case of No in step S8, that is, in the case of No in step S2 and the uneven driving process is not being executed, this control ends. In the case of Yes in step S8, the ECU 4 executes a recovery process (step S9). The recovery process is a process of stopping the uneven driving process and recovering the number of the driven converter circuits 20a to 20c and the share ratios to the original drive state before the uneven driving process is executed. After the recovery process is executed, this control ends. As described above, even when at least one converter circuit is driven and at least one converter circuit is stopped, by performing the uneven driving process so that the overall conversion efficiency is improved, the abnormality diagnosis can be executed at an early stage while suppressing the decrease in the overall conversion efficiency.

For example, when the number of the driven converter circuits in the case where the start condition is satisfied is one, it is preferable to execute the uneven driving process by setting the share ratio of any one converter circuit to 90% or more. This is because, when the number of the driven converter circuits in the case where the start condition is satisfied is only one, the overall conversion efficiency is improved because (i) driving by one converter circuit is performed, and (ii) by setting the share ratio of any one of the converter circuits to 90% or more, it is possible to suppress a decrease in the overall conversion efficiency during the execution of the uneven driving process. For the same reason, when the number of the driven converter circuits in the case where the start condition is satisfied is two, it is preferable to execute the uneven driving process by setting a total of the share ratios of any two converter circuits to 90% or more. That is, it is preferable to execute the uneven driving process by setting the total of the share ratios of the same number of the converter circuits as the number of driven converter circuits when the start condition is satisfied to 90% or more.

In the example shown in FIG. 5, all of the converter circuits 20a to 20c are controlled in a discontinuous mode. However, it is preferable that at least the converter circuit having the smallest share ratio is controlled in the discontinuous mode. Here, the discontinuous mode is a drive mode in which the current flowing through the reactor of the converter circuit flows discontinuously, and is a state in which the current may become zero within one cycle as in the case of the reactor 21a in FIG. 4A or the reactors 21a to 21c in FIGS. 4B and 5, for example. A continuous mode is a drive mode in which the current flowing through the reactor of the converter circuit flows continuously, and is a state in which the current does not become zero as in FIGS. 3A and 4B. In the continuous mode, when the switching element of the converter circuit is switched from OFF to ON, the current flowing through the reactor is switched from the decreased state to the increased state, and the loss is increased at this time. In contrast, in the discontinuous mode, when the switching element of the converter circuit is switched from OFF to ON, the value of the current flowing through the reactor is zero, so that generation of such a loss is suppressed. This improves the conversion efficiency of the converter circuit. The conversion efficiency characteristics shown in FIG. 4C takes such a loss into consideration.

The discontinuous mode or the continuous mode can be evaluated by, for example, whether the following equation is satisfied.

$$(\text{Duty ratio}/100) \leq 1-(VL/VH) \qquad (5)$$

The character VL is an input voltage to the converter circuit. The character VH is the boosted output voltage from the converter circuit. When equation (5) is satisfied, it can be evaluated that the discontinuous mode is established, and when equation (5) is not satisfied, it can be evaluated that the continuous mode is established. The disclosure is not limited to the above evaluation, and the discontinuous mode or the continuous mode may be evaluated based on whether there is a period in which each current value measured by the current sensors 22a to 22c during the execution of the uneven driving process is zero within one cycle. When all of the converter circuits 20a to 20c are in the continuous mode during the execution of the uneven driving process, the ECU 4 may reselect the share ratios $\alpha$, $\beta$, and $\gamma$ so that at least one of or all of the converter circuits 20a to 20c are in the discontinuous mode. When at least two of the reactors 21a to 21c are in the continuous mode during the execution of the uneven driving process, the ECU 4 may reselect the share ratios α, β, and γ so that at least two of or all of the converter circuits 20a to 20c are in the discontinuous mode. The share ratios with which all of or at least one of the converter circuits 20a to 20c are in the continuous mode may be excluded from the map stored in the memory of the ECU 4 in advance.

The magnitude of the value of the current flowing through each of the reactors 21a to 21c during the execution of the diagnosis process needs to be equal to or larger than the minimum current value that can be confirmed by the ECU 4 via the current sensors 22a to 22c. The share ratios α, β, and γ are selected in consideration of the magnitude of the input current I so that the magnitude of the value of the current flowing through each of the reactors 21a to 21c during the execution of the diagnosis process is not less than the minimum current value. Further, due to the difference between the delay of an ON signal and the delay of an OFF signal that are supplied from the ECU 4 to the switching elements 36a to 36c, the actual duty ratio may be lower than a desired value, and thus the respective current values of the reactors 21a to 21c may decrease. In view of this, the share ratios α, β, and γ are selected in consideration of the magnitude of the input current I.

In the above-described embodiment, the case where three converter circuits 20a to 20c are provided has been described as an example, but the disclosure is not limited to this, and four or more converter circuits may be provided.

In the above-described embodiment, the ECU 4 that integrally controls the entire fuel cell system 1 mounted in the vehicle has been described as an example of the control device that controls the FDC 20, but the disclosure is not limited to this, and the control device may be a computer that includes a CPU that controls the FDC 20, a ROM, and a RAM and that is provided separately from such an ECU 4, for example. Further, the fuel cell system 1 mounted in the vehicle has been described as an example of the power supply system, but the disclosure is not limited to this, and the power supply system may be a stationary fuel cell system.

Although the FC 10 that is a polymer electrolyte fuel cell is used as a power source in the above-described embodiment, a fuel cell other than the polymer electrolyte fuel cell may be used, and a storage battery such as a lithium ion battery or a nickel hydrogen battery may be used.

Although the embodiment of the disclosure has been described in detail above, the disclosure is not limited to such a specific embodiment, and various modifications and changes can be made.

What is claimed is:

1. A control device of a multi-phase converter having N boost converter circuits connected in parallel in which N≥3 holds, the control device comprising:

an evaluation unit configured to evaluate whether a start condition for abnormality diagnosis of the multi-phase converter is satisfied in a state where the number of driven converter circuits is one or more and N−1 or less;

a determination unit configured to determine a share ratio of each of the N converter circuits to unevenly share input current to the multi-phase converter among the N converter circuits, when the start condition is satisfied, such that a conversion efficiency indicating a ratio of output power from the multi-phase converter with respect to input power to the multi-phase converter is higher in a case where the input current is unevenly shared by the N converter circuits compared to a case where the input current is evenly shared by the N converter circuits;

a drive unit configured to drive the N converter circuits in accordance with the determined share ratios; and a diagnosis unit configured to diagnose an abnormality of the N converter circuits in a state where the N converter circuits are driven in accordance with the determined share ratios.

2. The control device according to claim 1, wherein the determination unit is configured to determine each share ratio such that a total of the share ratios of the same number of the converter circuits as the number of driven converter circuits when the start condition is satisfied occupies 90% or more of the total of the share ratios of the N converter circuits.

3. The control device according to claim 1, wherein the determination unit is configured to determine each share ratio such that a current flows discontinuously through at least one reactor of the N converter circuits.

4. The control device according to claim 1, wherein the determination unit is configured to determine each share ratio such that a current flows discontinuously through all of reactors of the N converter circuits.

5. A power supply system comprising: the control device of the multi-phase converter according to claim 1; the multi-phase converter; and a power supply that supplies the input power to the multi-phase converter.

6. The power supply system according to claim 5, wherein the power supply is a fuel cell stack.

* * * * *